(12) United States Patent
Wong et al.

(10) Patent No.: US 6,448,542 B2
(45) Date of Patent: Sep. 10, 2002

(54) MICROWAVE COOKING RACK

(76) Inventors: Nancy J. Wong, 6 Jeffrey Rd., Wayland, MA (US) 01778; Darrell L. Wong, 6 Jeffrey Rd., Wayland, MA (US) 01778

( * ) Notice: Subject to any disclaimer, the term of this patent is extended or adjusted under 35 U.S.C. 154(b) by 0 days.

(21) Appl. No.: 09/741,981

(22) Filed: Dec. 20, 2000

Related U.S. Application Data

(60) Provisional application No. 60/171,744, filed on Dec. 22, 1999.

(51) Int. Cl.$^7$ ............................................... H05B 6/80
(52) U.S. Cl. ....................................... 219/732; 219/753
(58) Field of Search ................................ 219/732, 733, 219/731, 725, 752, 762, 763, 753; 99/425, 444, 446, 448–450, 426; 426/622, 93, 457, 557; 126/21 A, 200, 369, 337 A

(56) References Cited

U.S. PATENT DOCUMENTS

| | | | |
|---|---|---|---|
| 3,288,054 A | 11/1966 | Weprin et al. ............... 99/260 |
| 3,366,035 A | 1/1968 | Jones ........................... 99/334 |
| 3,407,723 A | 10/1968 | Varkala ........................ 99/349 |
| 3,532,511 A | 10/1970 | Binkerd et al. ............... 99/107 |
| 3,614,365 A | 10/1971 | Lane ............................. 219/763 |
| 3,674,504 A | 7/1972 | Lane ............................. 99/107 |
| 3,824,916 A | 7/1974 | Green et al. .................. 99/334 |
| 3,906,115 A | 9/1975 | Jeppson ....................... 426/243 |
| 3,961,568 A | 6/1976 | Jeppson ....................... 99/339 |
| 3,994,212 A | 11/1976 | Wong ........................... 99/444 |
| 4,064,797 A | 12/1977 | Forlani ......................... 99/341 |
| 4,074,102 A | 2/1978 | Asen ............................. 219/754 |
| 4,112,833 A | 9/1978 | Oda et al. ..................... 99/425 |
| 4,121,510 A | 10/1978 | Frederick ..................... 99/425 |
| 4,129,067 A | 12/1978 | Reiland ........................ 99/391 |
| 4,140,889 A | 2/1979 | Mason, Jr. et al. .......... 219/754 |
| 4,173,180 A | 11/1979 | Reiland ........................ 99/391 |
| 4,214,515 A | 7/1980 | Kubiatowicz ................. 99/400 |
| 4,228,334 A | * 10/1980 | Clark et al. .................. 219/729 |
| 4,286,133 A | * 8/1981 | Einset et al. ................. 219/753 |
| 4,343,978 A | 8/1982 | Kubiatowicz ................. 219/763 |
| 4,403,540 A | 9/1983 | Erkelenz ....................... 99/375 |
| 4,407,189 A | * 10/1983 | Bentson ..................... 99/421 HH |
| 4,453,628 A | 6/1984 | Walter .......................... 206/45.31 |
| 4,786,513 A | 11/1988 | Monforton et al. .......... 426/107 |
| 4,818,832 A | 4/1989 | Fukumoto .................... 219/763 |
| 4,857,342 A | 8/1989 | Kappes ......................... 426/107 |
| 4,862,791 A | 9/1989 | Baughey ....................... 99/400 |
| 4,870,237 A | 9/1989 | Fukumoto .................... 219/754 |
| 4,917,911 A | 4/1990 | Bush et al. .................... 426/243 |
| 4,924,049 A | 5/1990 | Dexter, Jr. .................... 219/732 |
| 4,933,528 A | 6/1990 | Barr .............................. 219/732 |
| 4,950,524 A | 8/1990 | Hacker ......................... 428/163 |
| 4,952,764 A | 8/1990 | Harrington ................... 219/732 |
| 4,954,356 A | 9/1990 | Kappes ......................... 426/107 |
| 4,957,756 A | 9/1990 | Olander et al. ............... 426/243 |
| D318,206 S | 7/1991 | Watznauer .................... D7/409 |
| 5,039,833 A | 8/1991 | Woods .......................... 219/732 |
| 5,075,526 A | 12/1991 | Sklenak et al. ............... 219/730 |
| 5,093,176 A | 3/1992 | Pribonic et al. .............. 428/76 |
| 5,132,126 A | 7/1992 | Sinkler et al. ................ 426/241 |
| 5,141,761 A | 8/1992 | Haerr ............................ 426/393 |
| 5,151,568 A | 9/1992 | Rippley ........................ 219/732 |
| 5,520,944 A | 5/1996 | Richardson et al. ......... 426/438 |
| 5,552,585 A | 9/1996 | Fleck et al. ................... 219/732 |
| 5,650,085 A | 7/1997 | Chen ............................. 219/732 |
| 5,714,740 A | 2/1998 | Kelly et al. ................... 219/732 |
| 6,229,131 B1 | * 5/2001 | Koochaki ..................... 219/731 |
| 6,279,467 B1 | * 8/2001 | Tiemann ....................... 99/426 |

FOREIGN PATENT DOCUMENTS

| | | |
|---|---|---|
| EP | 0 271 268 B1 | 6/1988 |
| EP | 0 535 451 A1 | 4/1993 |

* cited by examiner

*Primary Examiner*—Teresa Walberg
*Assistant Examiner*—Quang Van
(74) *Attorney, Agent, or Firm*—Hamilton, Brook, Smith & Reynolds, P.C.

(57) ABSTRACT

A cooking rack including a series of support members moveably coupled together for supporting a food product, the support members capable of moving relative to each other during cooking to accommodate shrinkage of the food product.

20 Claims, 10 Drawing Sheets

MICROWAVE COOKING RACK

RELATED APPLICATIONS

This application claims the benefit of U.S. Provisional Application No. 60/171,744, filed on Dec. 22, 1999, the entire teachings of which are incorporated herein by reference.

BACKGROUND

Trays for cooking bacon in a microwave oven typically consist of a plastic tray having a slightly angled surface onto which strips of bacon are placed. The angled surface includes a series of grooves allowing the grease to flow from the bacon during cooking and collect in a reservoir adjacent to and below the angled surface. A draw back with this design is that the strips of bacon have a tendency to stick to the angled surface while cooking. As a result, the strips of bacon are unable to shrink in length while cooking and become very thin and brittle. Consequently, the long thin brittle strips of bacon are difficult to remove from the tray without breaking.

SUMMARY

The present invention provides a cooking rack including a series of support members moveably coupled together for supporting a food product, the support members capable of moving relative to each other during cooking to accommodate shrinkage of the food product.

In preferred embodiments, the support members are moveably secured to each other by a flexible connecting member, and in some cases, a pair of flexible connecting members. In one embodiment, the support members are secured to flexible sheet material having two weakened lines which allow a central region of the sheet material to be removed. In another embodiment, the support members are separated from each other by sheet material having a series of holes therethrough. In still another embodiment, the support members are movably contained by a containing member. The containing member includes opposed side members where the support members are movably contained by elongate slots formed within the side members. The containing member may be a tray with the side members forming opposed walls of the tray. The support members may be coated with microwave susceptor material.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
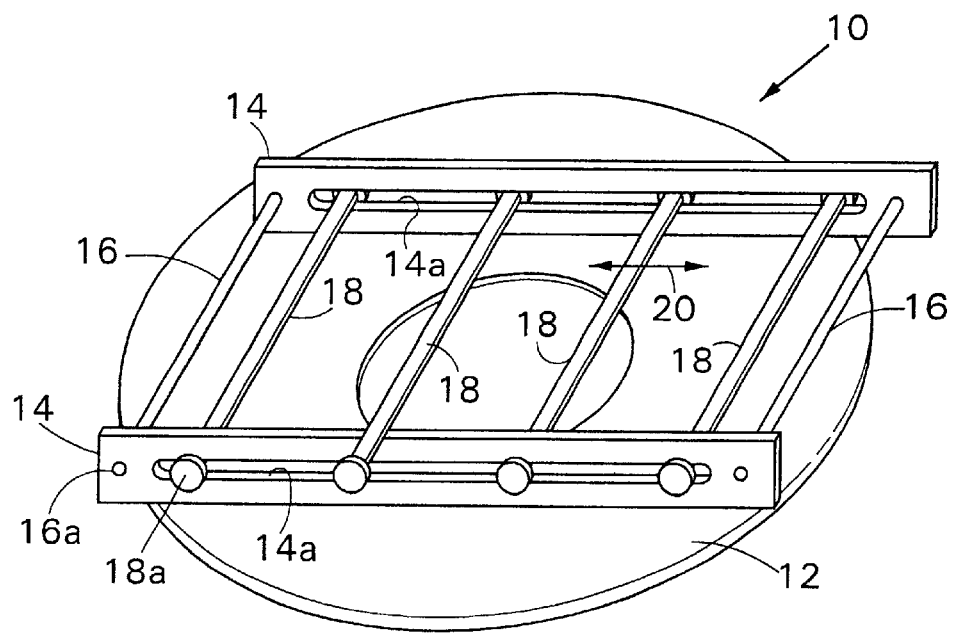
FIG. 1 is a perspective view of an embodiment of a cooking rack positioned on a plate.

A description of preferred embodiments of the invention follows. Referring to FIG. 1, cooking rack 10 includes two side members 14 which are coupled together by two connecting rods 16. A series of support members 18 extend between and are slidably coupled to the side members 14. Each side member 14 has an elongate slot 14a and two holes 16a located at opposite ends of slot 14a. The ends of the connecting rods 16 are secured within the holes 16a of side members 14 and rigidly space the side members 14 apart from each other in parallel fashion. The support members 18 include enlarged knobs 18a at the ends of the support members 18 which slidably secure the support members 18 within the slots 14a and trap the side members 14 between the knobs 18a. As a result, the support members 18 are able to slide laterally in the direction of arrows 20. Preferably, cooking rack 10 is sized to sit atop a standard sized plate 12 for cooking within a microwave oven. Cooking rack 10 is preferably made of wood, but alternatively, may be made of plastic or paperboard. In addition, cooking rack 10 may be made of metal for cooking within a standard oven or grill.

Figure 2:
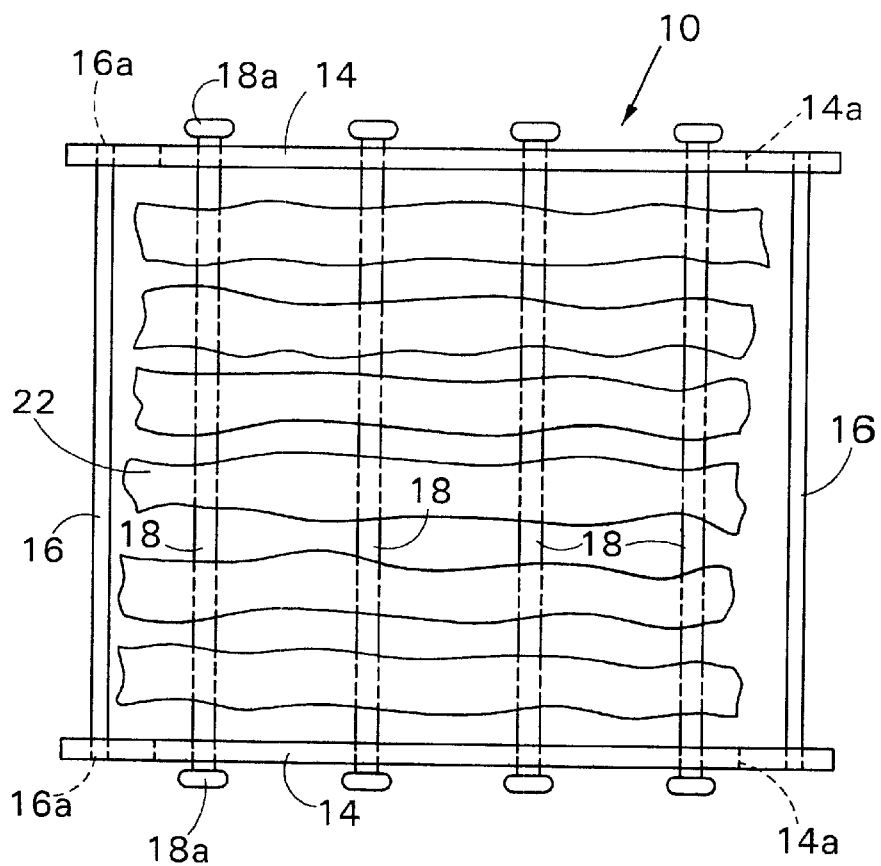
FIG. 2 is a plan view of the cooking rack of FIG. 1 with strips of bacon positioned thereon.
Figure 3:
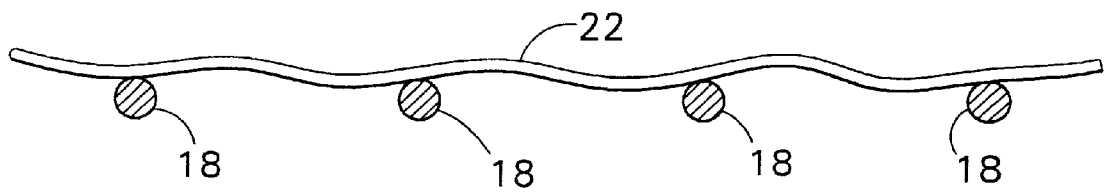
FIG. 3 is a side schematic view of bacon supported by the support members of the cooking rack of FIG. 1.
Figure 4:
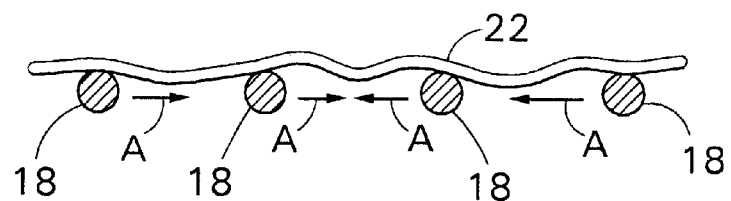
FIG. 4 is a side schematic view depicting the support members of the cooking rack of FIG. 1 moving inwardly as the bacon shrinks during cooking.

In use, referring to FIGS. 2 and 3, a series of strips of bacon 22 are placed upon and supported by the support members 18 of cooking rack 10 in side by side fashion. The support members 18 are positioned to be evenly spaced apart from each other. The cooking rack 10 is placed in a microwave oven while sitting atop the plate 12. As the strips of bacon 22 cook, the bacon 22 begins to shrink in length and at the same time, tends to stick to the support members 18. As a result, while the bacon 22 shrinks, the support members 18 gradually move to the center of cooking rack 10 as indicated by arrows A in FIG. 4. This allows the bacon 22 to shrink while cooking so that the bacon does not become thin and stretched out as with prior art cooking racks. In addition, the bacon 22 cooks in a relatively flat manner and has the appearance of pan fried bacon. Furthermore, since the cooking rack 10 is placed on a plate 12 with the bacon 22 raised above the surface of the plate 12 by the support members 18, the grease from the bacon 22 drips down from the bacon 22 between the support members 18 and collects on the plate 12 below. Consequently, the strips of bacon 22 do not sit in bacon grease while cooking. Once the strips of bacon 22 are cooked, the bacon 22 may stick slightly to the support members 18 along thin lines of contact but may be easily pulled from the support members 18 without breaking the cooked bacon 22.

Figure 5:
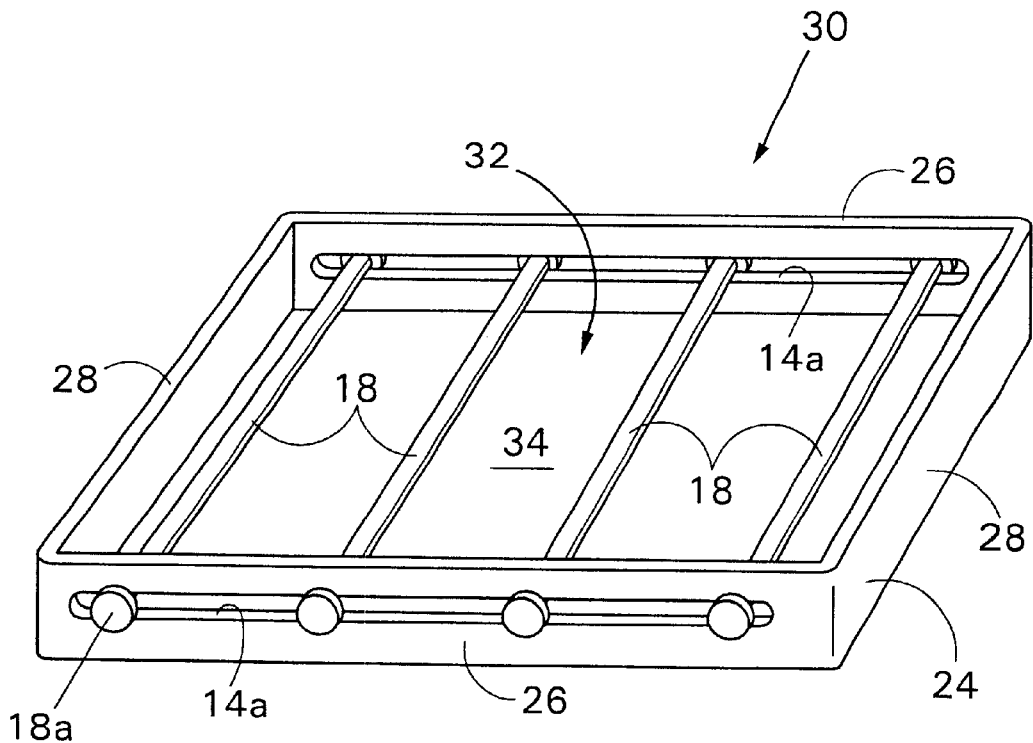
FIG. 5 is a perspective view of an embodiment of another cooking rack.

FIG. 5 depicts another cooking rack 30 which differs from cooking rack 10 in that instead of having side members 14 and connecting rods 16, cooking rack 30 includes a tray 24 having two opposed side walls 26, two opposed end walls 28 and a bottom wall 34. The side walls 26 each have an elongated slot 14a for slidably coupling the support members 18 to tray 24. Cooking rack 30 does not require a plate 12 for collecting grease but instead collects grease within the interior 32 of tray 24.

Figure 6:
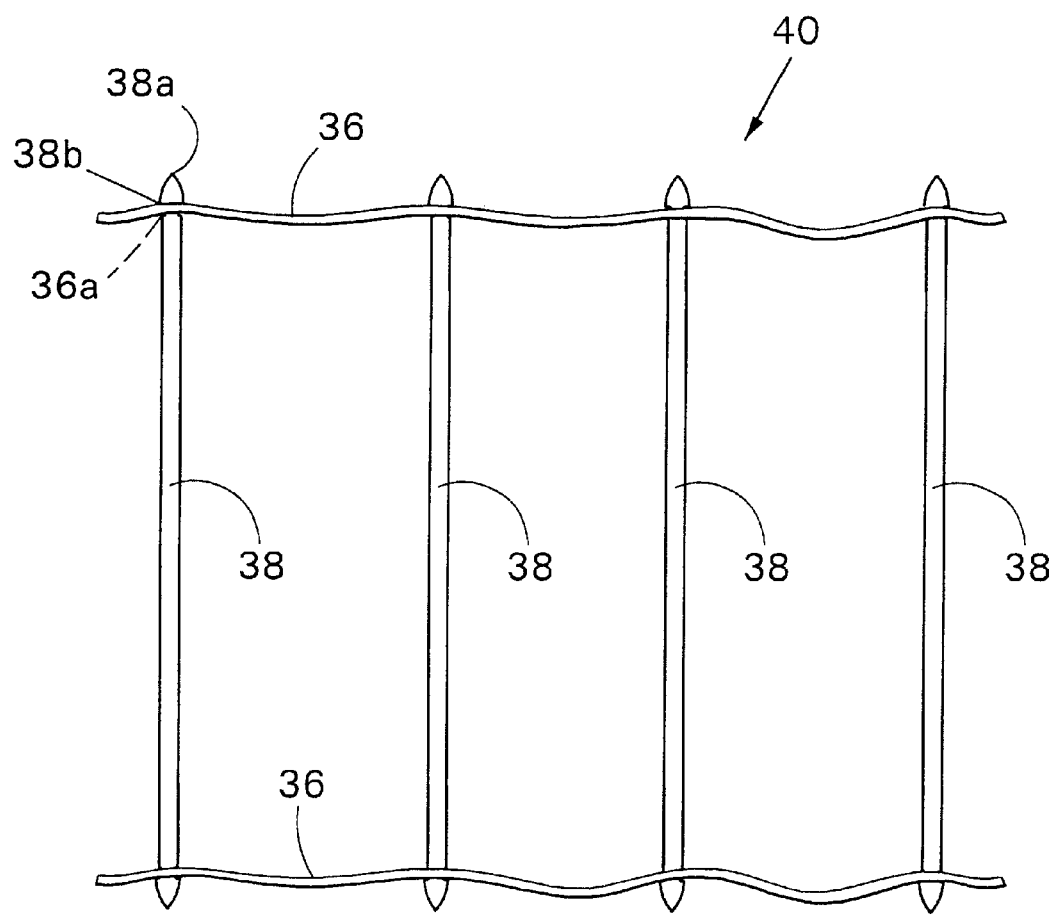
FIG. 6 is a plan view of an embodiment of yet another cooking rack.
Figure 7:
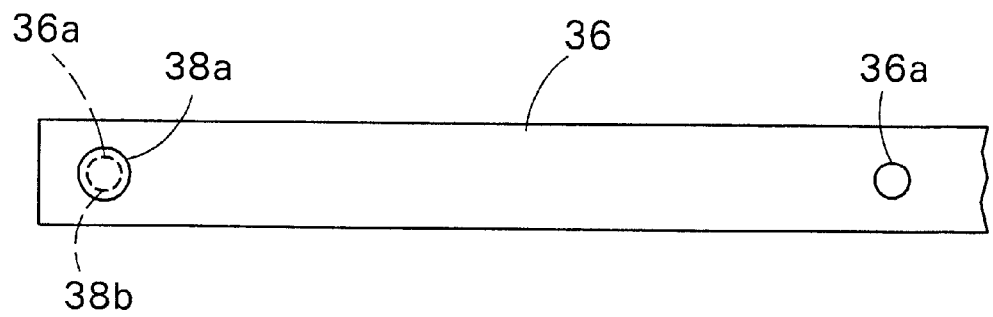
FIG. 7 is a side view of a portion of the cooking rack of FIG. 6.

FIGS. 6 and 7 depict another cooking rack 40 which includes a series of support members 38 which are movably coupled togther by flexible strap members 36. Each support member 38 includes pointed ends 38a which are adjacent to necks 38b having narrowed diameters. The support members 38 are secured to the flexible strap members 36 by pushing the pointed ends 38a through a series of holes 36a within the flexible strap members 36. The holes 36a are preferably sized to have a diameter that is about the same diameter or less than that of the necks 38b. The holes 36a expand to allow the pointed ends 38a to pass through before being captured within the necks 38b of the support members 38. The flexible strap members 36 are preferably ribbon shaped and formed of flexible material such as a polymer, leather, textile, and are flexible enough to allow the support members 38 to move together but are rigid enough not to tangle with each other or with the support members 38. The support members 38 are preferably formed of wood, plastic or paperboard.

In use, cooking rack 40 is placed on a plate 12. Next, strips of bacon 22 are placed upon the support members 38 in a manner similar to that depicted in FIGS. 2 and 3. When cooking in a microwave oven, as the strips of bacon 22 shrink, the support members 38 move towards each other and towards the center in a manner similar to that depicted in FIG. 4. When cleaning cooking rack 40, the support members 38 can be detached from the flexible strap members 36.

Figure 8:
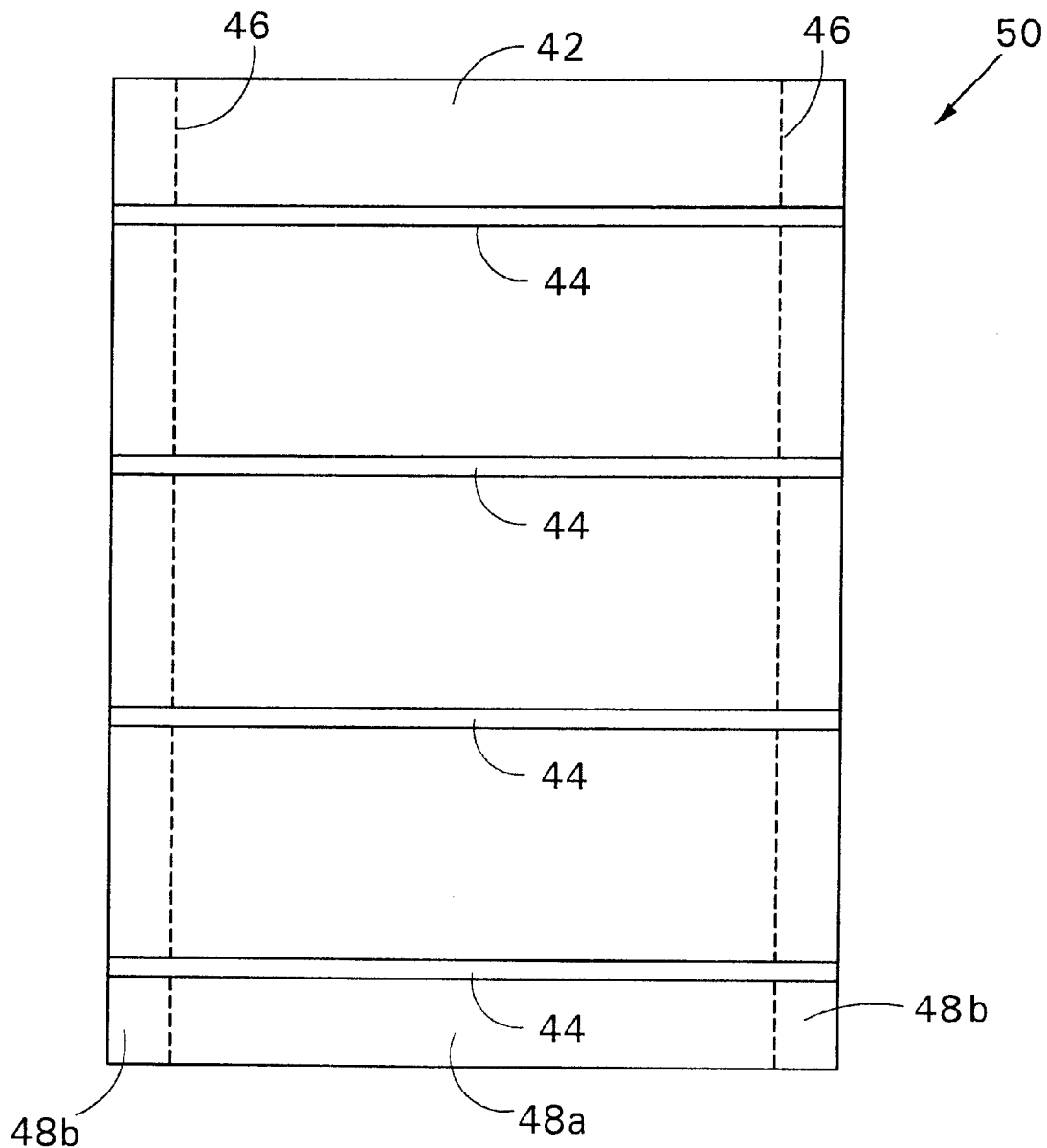
FIG. 8 is a plan view of an embodiment of still another cooking rack.

Referring to FIG. 8, cooking rack 50 includes a sheet of flexible ovenable material 42 which is secured to a series of spaced support members 44. The sheet of ovenable material 42 has two perforated lines 46 which defines a central region 48a and two outer strips 48b. The support members 44 are secured to the sheet of ovenable material 42 at the outer strips 48b. The sheet of ovenable material 42 is preferably ovenable paper or parchment which has a nonstick surface, but, alternatively, can be flexible plastic or nonwoven textile. The support members 44 are preferably wood, but alternatively, may be plastic or paperboard. Depending upon the materials employed for sheet 42 and support members 44, support members 44 may be secured to sheet 42 by gluing, heat sealing, ultrasonic welding, or stitching, etc.

Figure 9:
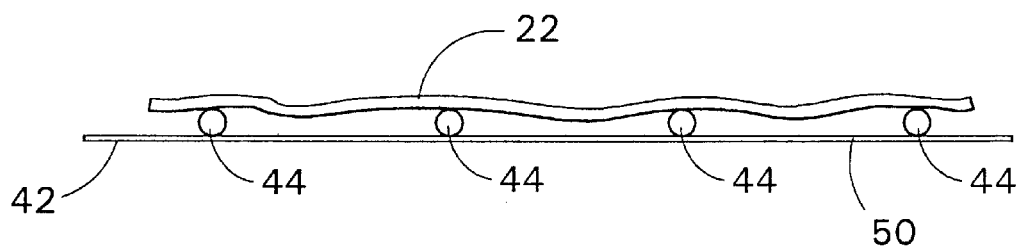
FIG. 9 is a side view of the cooking rack of FIG. 8 supporting bacon.
Figure 10:
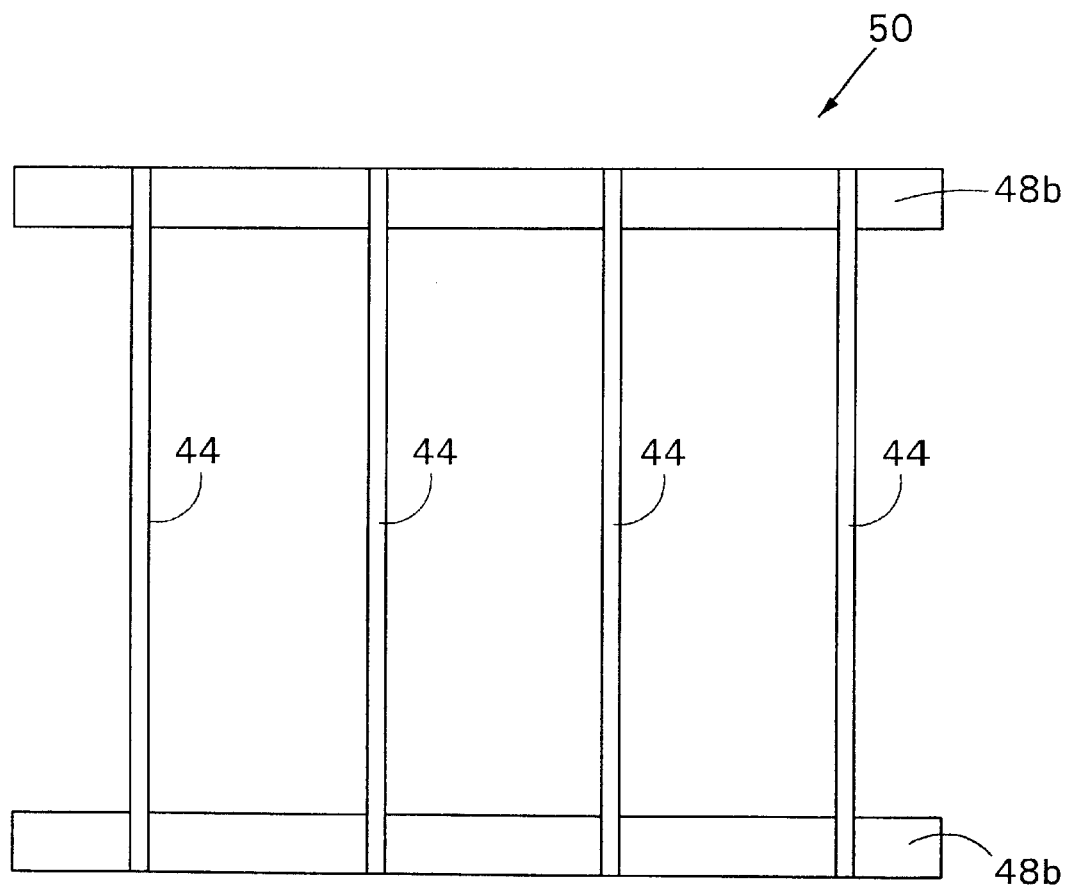
FIG. 10 is a plan view of the cooking rack of FIG. 8 with the center of the bottom sheet removed.

Referring to FIG. 9, strips of bacon 22 are placed upon cooking rack 50 in preparation for cooking. Before cooking, the user grasps the central region 48a of the sheet of ovenable material 42 and pulls in a downwardly and backwardly direction. This separates the central region 48a from the outer strips 48b along perforated lines 46. Once the central region 48a is removed as depicted in FIG. 10, only the support members 44 and the outer strips 48b remain. The strips of bacon 22 are omitted in FIG. 10 to more clearly show the removal of the central region 48a. The cooking rack 50 supporting the bacon 22 is then placed on a plate and placed within a microwave oven. The outer strips 48b behave in a manner similar to the flexible strap members 36 of cooking rack 40 and allow the support members 44 to move towards each other when the strips of bacon 22 shrink during cooking. The configuration depicted in FIG. 10 may also be formed in one integral piece from plastic or paper products.

Referring to FIG. 1, cooking rack 50 may be used for packaging strips of bacon 22. Multiple cooking racks 50 supporting strips of bacon 22 are stacked on top of each other for storage within a carton. The cooking racks 50 are then removed as needed for use. Alternatively, cooking rack 50 may be used in rolls.

Figure 12:
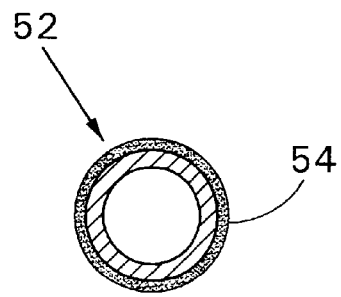
FIG. 12 is a cross-sectional view of an embodiment of another support member.

Referring to FIG. 12, support members 52 are other support members which are formed of hollow paperboard tubes and coated with microwave susceptor material 54 for browning food along lines of contact. Support members 52 may be used when it is desireable for the food being cooked to have grill-like marks on the food. Support members 52 can also be solid and may be wood or plastic.

Figure 13:
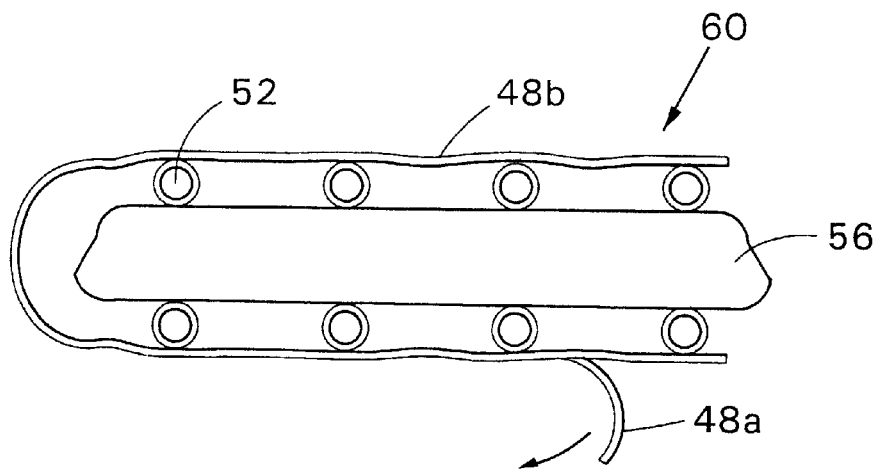
FIG. 13 is a side view of an embodiment of another cooking rack supporting food

Referring to FIG. 13, cooking rack 60 is similar to cooking rack 50 but differs in that cooking rack 60 includes support members 52 and wraps around the bottom and top surfaces of a food item 56, for example, a steak, hamburger, pork chop, etc. The central region 48a may be removed as shown or left in place to prevent the food item 56 from drying out. The microwave susceptor material 54 of the support members 52 absorb microwave energy and heat up thereby browning the food item 56 along lines of contact that resemble grill marks. Since the support members 52 contact both the top and bottom surfaces of the food item 56, the top and bottom surfaces acquire the browned lines of contact simultaneously. This allows the food product 56 to be cooked within a microwave oven while having the appearance of being cooked conventionally. Typically, cooking rack 60 and the food item 56 are placed upon a plate in the microwave oven.

Figure 11:
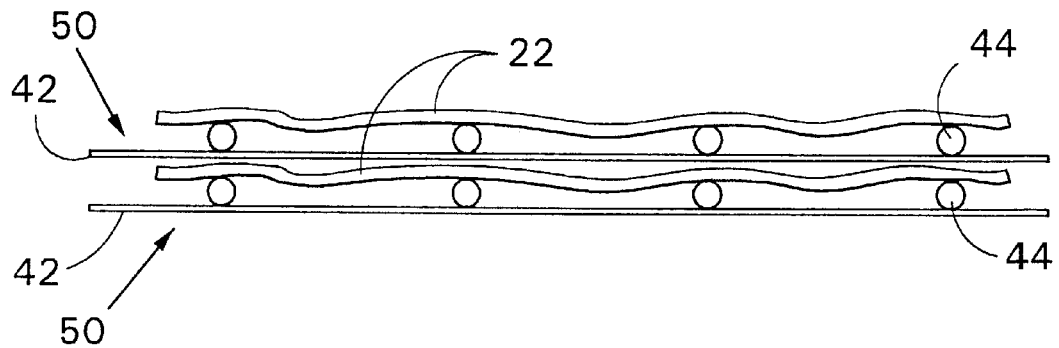
FIG. 11 is a side view of two cooking racks of FIG. 8 supporting bacon and stacked upon each other.
Figure 14:
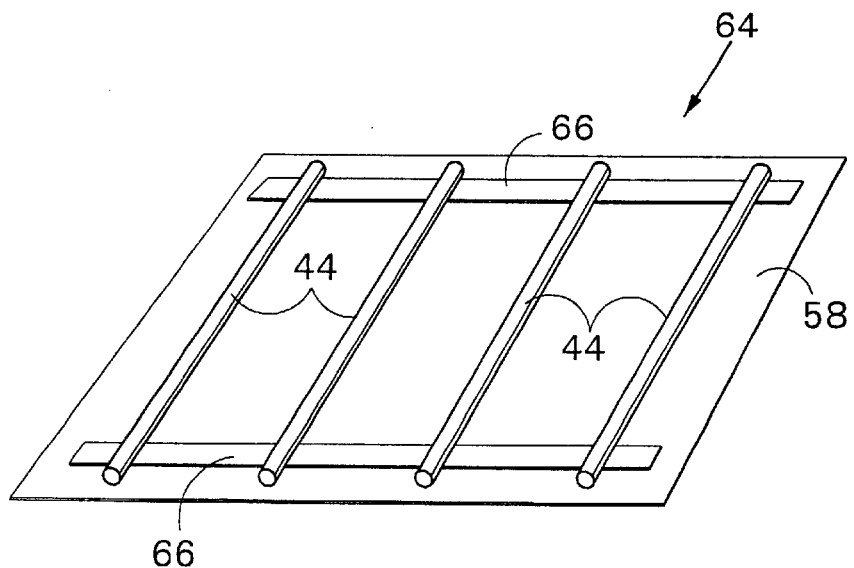
FIG. 14 is a perspective view of an embodiment of still another cooking rack.

Referring to FIG. 14, cooking rack 64 is another cooking rack for storing and cooking strips of bacon 22. Cooking rack 64 includes a series of support members 44 which are secured to flexible strips 66. The flexible strips 66 are removably attached to a sheet of flexible food wrapping material 58. As a result, strips of bacon 22 can be stored on cooking rack 64 in a manner similar to that depicted in FIG. 11. In use, sheet 58 is separated from flexible strips 66 before placement onto a plate 12 for cooking in a microwave oven. As the strips of bacon 22 shrink while cooking, the flexible strips 66 allow the support members 44 to move together in a manner similar to that depicted in FIG. 4.

Figure 15:
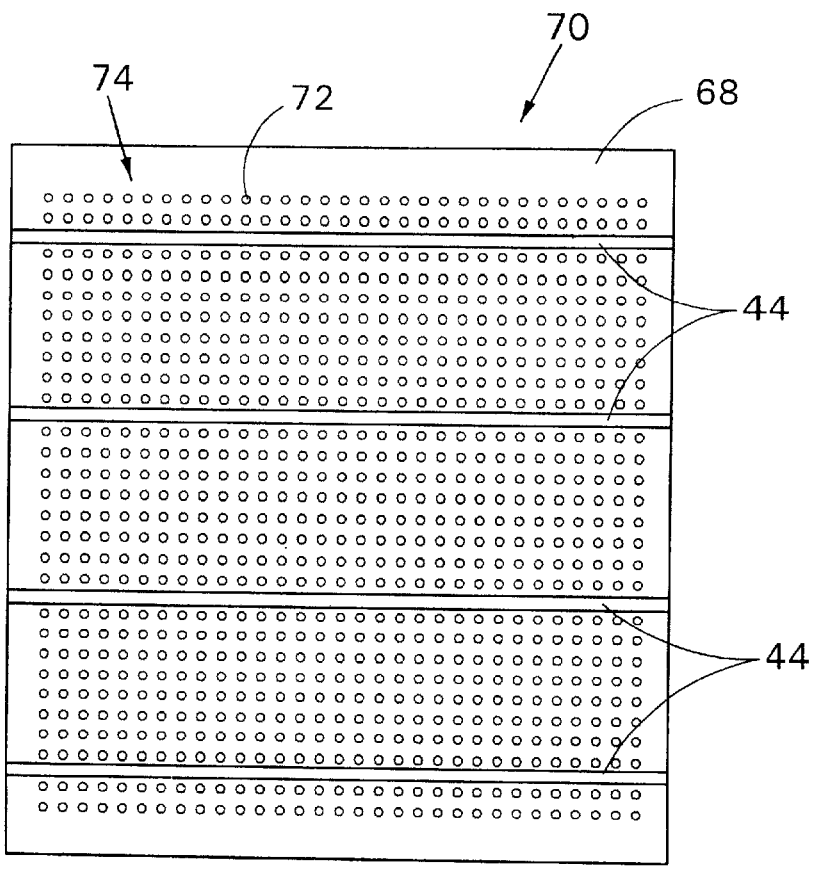
FIG. 15 is a plan view of an embodiment of yet another cooking rack.

Referring to FIG. 15, cooking rack is another cooking rack for storing and cooking strips of bacon 22. Cooking rack 70 includes a sheet of flexible ovenable material 68 having a pattern 74 of holes 72 therethrough. A series of evenly spaced support members 44 are secured to the sheet of ovenable material 68 preferably at the outer edges. The sheet of ovenable material 68 extends between support members 44 and is preferably ovenable paper or parchment, but alternatively, may be plastic. Although a sheet of ovenable material 68 having a pattern 74 of holes 72 is preferred, alternatively, a sheet of mesh type or absorbent material may be used. In addition, although cooking rack 70 typically has a series of support members 44 which are secured to sheet 68, such as by gluing, heat sealing, ultrasonic welding, or stitching, etc., alternatively, cooking rack 70 may be formed in a manner where the support members 44 are integral with sheet 68. Such an integral structure may have solid, hollow or corrugated rib support members 44 and be formed of plastic or paper products, or a composite thereof, which includes laminations.

Figure 16:
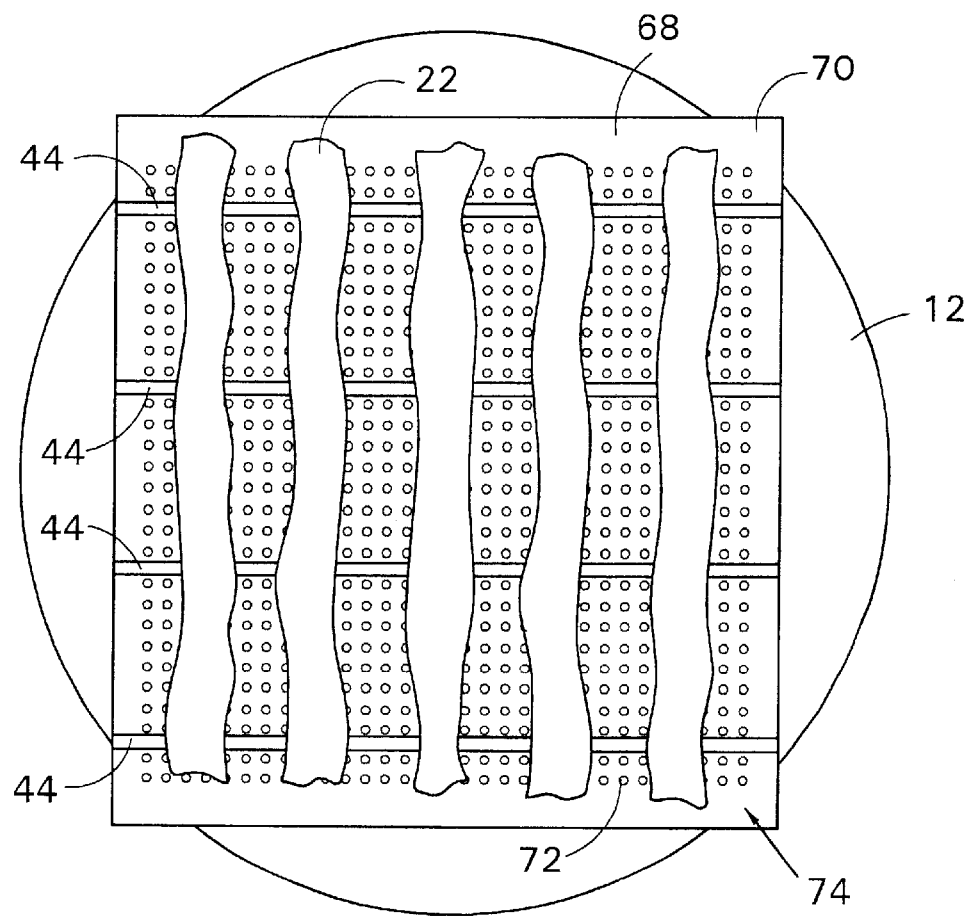
FIG. 16 is a plan view of the cooking rack of FIG. 15 positioned on a plate and supporting strips of bacon.

Referring to FIG. 16, in use, strips of bacon 22 are supported on cooking rack 70 and placed upon a standard sized plate 12. When cooking within a microwave oven, the grease from the bacon 22 drips through the holes 72 in the ovenable material 68 and collects on the plate 12 below. As a result, the bacon 22 is able to cook without being submerged within grease. In addition, as the strips of bacon 22 shrink, the flexible nature of the ovenable paper 68 allows the support members 44 to move inwardly towards each other in a manner similar to that depicted in FIG. 4. This allows the bacon to shrink like conventionally cooked bacon.

Figure 17:
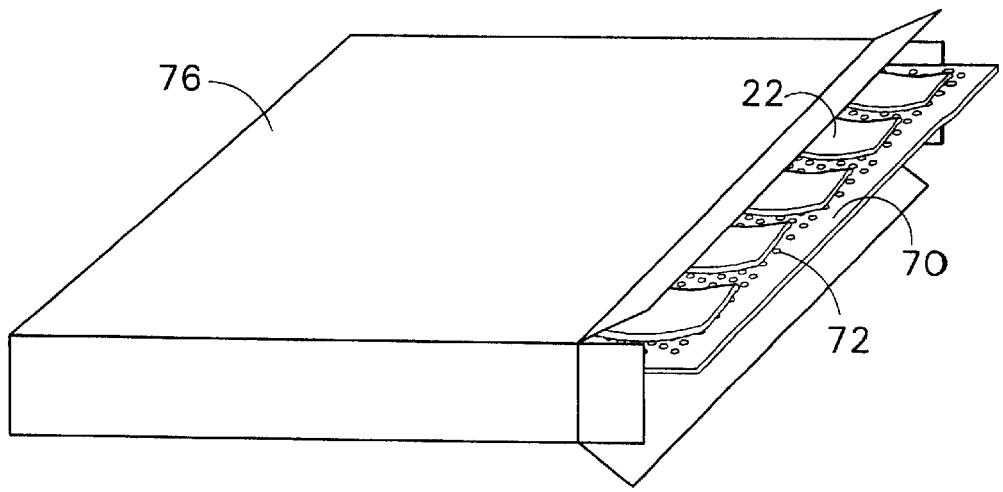
FIG. 17 is a perspective view of a carton containing a stack of the cooking racks of FIG. 15 supporting bacon.

FIG. 17 depicts the manner in which cooking rack 70 may be used for packaging and storing strips of bacon 22. A series of cooking racks 70 supporting strips of bacon 22 are stacked upon one another in a manner similar to that depicted in FIG. 11. The stack is then stored within a carton 76. The cooking racks 70 are removed from the carton 76 for placement within a microwave oven as needed. Although cooking rack 70 has been described for use with bacon, cooking rack 70 may be used with any suitable food item.

Figure 18:
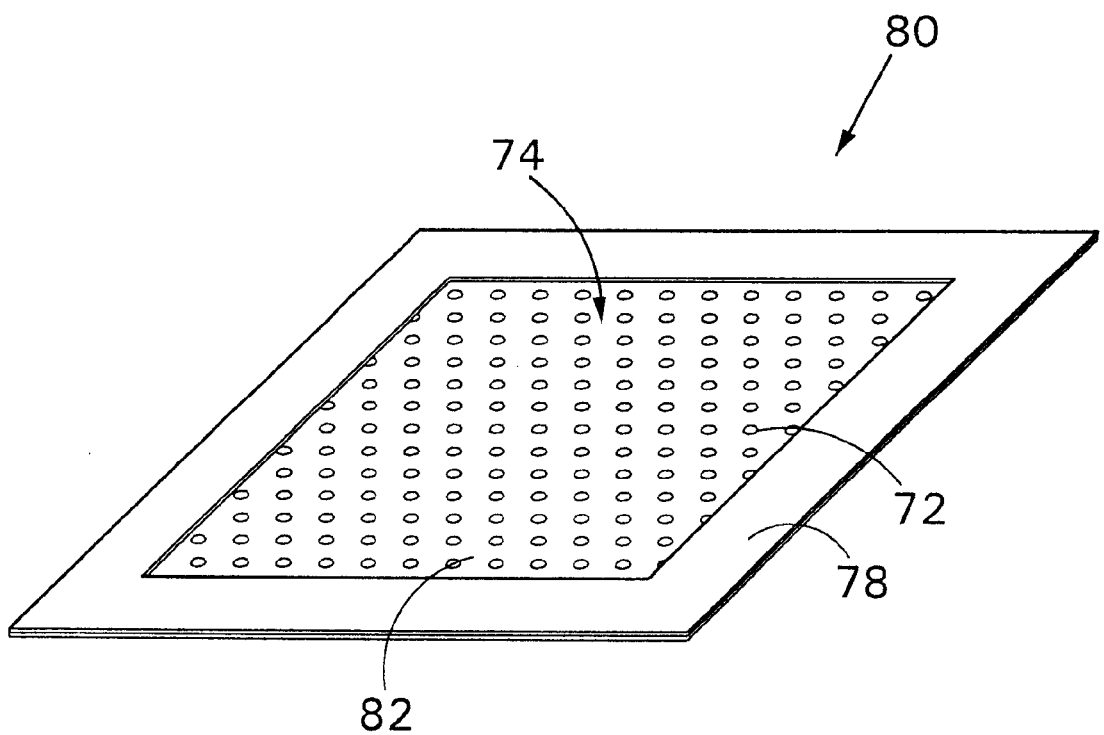
FIG. 18 is a perspective view of an embodiment of another cooking rack.

Referring to FIG. 18, cooking rack 80 includes a rigid outer frame 78 which is secured to a region of flexible ovenable material 82 having a pattern 74 of holes 72 therethrough. Food for cooking is supported by the region of material 82. During cooking within a microwave oven, cooking rack 80 is supported on a plate 12. Although the flexible ovenable material 82 is typically paper, parchment, or plastic, alternatively, the region can be made of or supported by rigid material with holes 72 therethrough. In such a case, outer frame 78 may be omitted. Support members may be included to provide stiffness.

Figure 19:
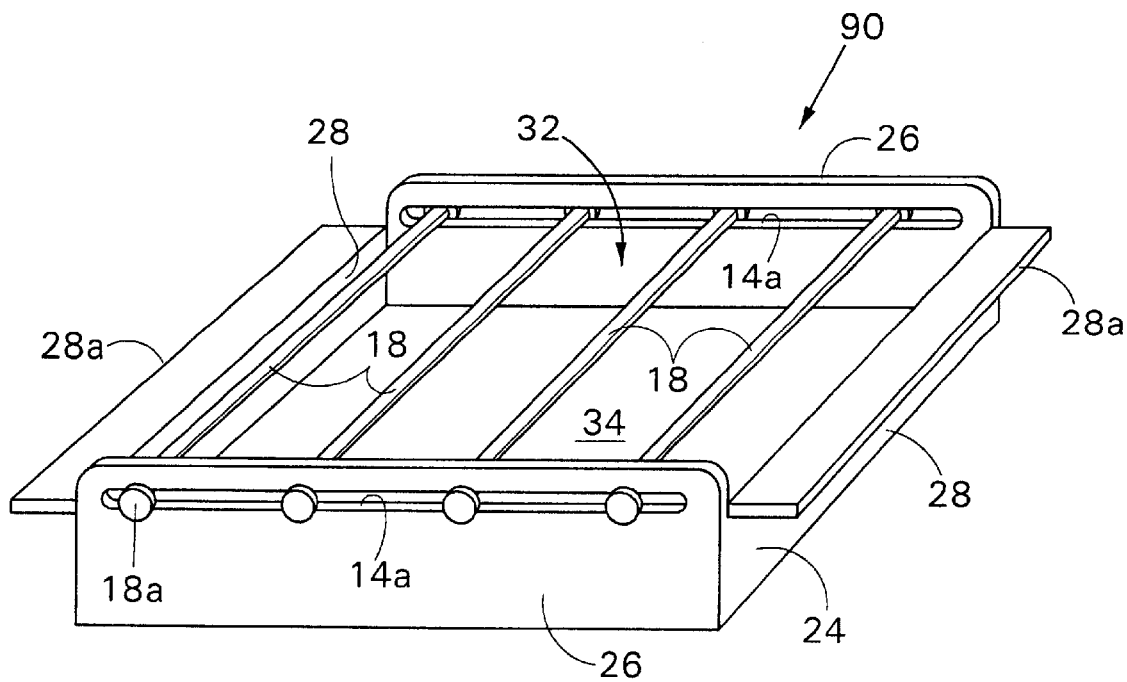
FIG. 19 is a perspective view of an embodiment of still another cooking rack.

Referring to FIG. 19, cooking rack 90 differs from cooking rack 30 (FIG. 5) in that end walls 28 include wings 28a extending outwardly therefrom in opposing directions. Wings 28a are located at the same horizontal level as support members 18 and may serve as temporary supports for the ends of the strips of bacon 22 before shrinking occurs during cooking. Additionally, wings 28a may serve as handles for lifting cooking rack 90.

Figure 20:
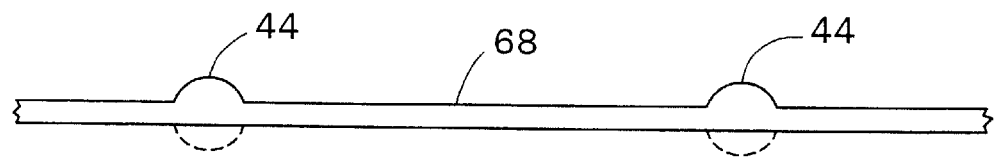
FIG. 20 is a side view of a portion of a variation of the cooking rack of FIG. 15.

Referring to FIG. 20, a variation in the construction of cooking rack 70 (FIG. 15) is depicted where the support members 44 are integrally formed with sheet 68 and consist of raised lateral ridges or bumps extending from the top surface of sheet 68. Although the strips of bacon 22 are typically placed over the support members 44, alternatively, the cooking rack may be inverted so that the strips of bacon 22 are placed on the opposite side. In addition, the support members may have raised ridges extending from the top and bottom surfaces of sheet 68 as shown in phantom. Sheet 68 is formed from the materials previously described for FIG. 15.

Figure 21:
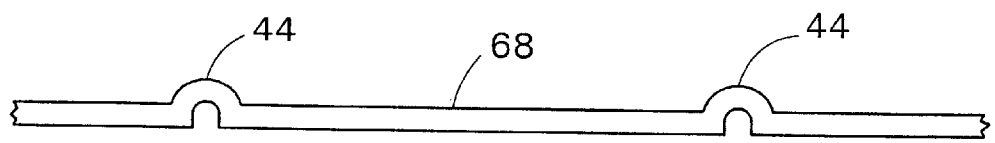
FIG. 21 is a side view of a portion of another variation of the cooking rack of FIG. 15.

Referring to FIG. 21, another variation in the construction of cooking rack 70(FIG. 15) is depicted where the support members 44 are integrally formed with sheet 68 and are corrugated.

While this invention has been particularly shown and described with references to preferred embodiments thereof, it will be understood by those skilled in the art that various changes in form and details may be made therein without departing from the scope of the invention encompassed by the appended claims.

For example, although the present invention has been primarily described for use with particular foods, it is understood that the present invention may be used with a wide variety of foods. In addition, the present invention may be also used with conventional ovens or grills. Furthermore, various components from the different cooking racks described may be combined. Also, nonsticking materials such as polyfluroethylene may be applied to the present invention as needed. Finally, the dimensions of the present invention may vary depending upon the application at hand.

What is claimed is:

1. A cooking rack comprising a series of support members moveably coupled together for supporting a food product, the support members capable of moving towards each other during cooking to accommodate shrinkage of the food product.

2. The rack of claim 1 in which the support members are moveably secured to each other by a flexible connecting member.

3. The rack of claim 2 in which the support members are secured to flexible sheet material, the sheet material having two weakened lines allowing a central region of the sheet material to be removed.

4. The rack of claim 2 in which the support members are separated from each other by flexible sheet material, the sheet material having a series of holes therethrough.

5. The rack of claim 1 in which the support members are moveably secured to each other by a pair of flexible connecting members.

6. The rack of claim 1 in which the support members are movably contained by a containing member.

7. The rack of claim 6 in which the containing member comprises opposed side members, the support members being movably contained by elongate slots formed within the side members.

8. The rack of claim 7 in which the containing member is a tray, the side members forming opposed walls of the tray.

9. The rack of claim 1 in which the support members are coated with microwave susceptor material.

10. A cooking rack comprising:
   a series of support members spaced apart from each other for supporting a food product; and
   flexible sheet material extending between the support members, the flexible sheet material moveably coupling the support members together such that the support members are capable of moving towards each other during cooking to accommodate shrinkage of the food product.

11. The cooking rack of claim 10 in which the flexible sheet material has two weakened lines allowing a central region of the sheet material to be removed.

12. The cooking rack of claim 10 in which the flexible sheet material has a series of holes therethrough.

13. The rack of claim 10 in which the support members and the flexible sheet material are integral with each other.

14. The rack of claim 10 in which the flexible sheet material is plastic.

15. A method of forming a cooking rack comprising the step of moveably coupling a series of support members together for supporting a food product, the support members capable of moving towards each other during cooking to accommodate shrinkage of the food product.

16. A method of forming a cooking rack comprising:

providing a series of support members spaced apart from each other for supporting a food product; and moveably coupling the support members together with flexible sheet material, the flexible sheet material being extending between the support members, the support members capable of moving towards each other during cooking to accommodate shrinkage of the food product.

17. The method of claim 16 further comprising forming the support members and the flexible sheet material integral with each other.

18. The method of claim 16 further comprising forming the flexible sheet material from plastic.

19. A cooking rack comprising a series of support members moveably coupled together for supporting a food product, the support members capable of moving relative to each other during cooking to accommodate shrinkage of the food product, the support members being movably contained by a containing member, the containing member comprising opposed side members, the support members being movably contained by elongate slots formed within the side members.

20. The rack of claim 19 in which the containing member is a tray, the side members forming opposed walls of the tray.

* * * * *